(12) United States Patent
Rappaport et al.

(10) Patent No.: US 7,716,209 B1
(45) Date of Patent: May 11, 2010

(54) AUTOMATED ADVERTISEMENT PUBLISHER IDENTIFICATION AND SELECTION

(75) Inventors: Alain T. Rappaport, Woodside, CA (US); Dan Adamson, Dallas, TX (US); Leo Shih, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 115 days.

(21) Appl. No.: 11/543,017

(22) Filed: Oct. 4, 2006

Related U.S. Application Data

(63) Continuation-in-part of application No. 11/265,994, filed on Nov. 3, 2005.

(60) Provisional application No. 60/624,558, filed on Nov. 3, 2004, provisional application No. 60/677,620, filed on May 4, 2005, provisional application No. 60/723,642, filed on Oct. 4, 2005.

(51) Int. Cl.
G06F 7/00 (2006.01)
G06F 17/30 (2006.01)

(52) U.S. Cl. .................. 707/713; 707/737; 707/754

(58) Field of Classification Search .............. 707/3, 707/5, 7
See application file for complete search history.

(56) References Cited

U.S. PATENT DOCUMENTS

| | | | |
|---|---|---|---|
| 6,789,076 B1 * | 9/2004 | Dutta | 707/5 |
| 6,944,611 B2 | 9/2005 | Flank et al. | |
| 7,065,500 B2 * | 6/2006 | Singh et al. | 705/26 |
| 7,299,222 B1 * | 11/2007 | Hogan et al. | 707/3 |
| 2002/0129015 A1 | 9/2002 | Caudill et al. | |
| 2005/0222901 A1 * | 10/2005 | Agarwal et al. | 705/14 |
| 2006/0004732 A1 * | 1/2006 | Odom | 707/3 |
| 2006/0047649 A1 | 3/2006 | Liang | |
| 2006/0106793 A1 * | 5/2006 | Liang | 707/5 |

FOREIGN PATENT DOCUMENTS

KR 2002092843 A * 12/2002

OTHER PUBLICATIONS

Notess, Greg R., Review of Hotbot (Inktomi), retrieved on Feb. 21, 2008. Retrieved from Internet via Wayback Machine Oct. 28, 2004 pull at <http://web.archive.org/web/20041028102910/www.searchengineshowdown.com/features/hotbot>.*
OA Dated Jul. 28, 2008 for U.S. Appl. No. 11265994, 36 pages.

* cited by examiner

*Primary Examiner*—James Trujillo
*Assistant Examiner*—Bruce M Moser
(74) *Attorney, Agent, or Firm*—Turocy & Watson, LLP

(57) ABSTRACT

A method of searching for information includes receiving a query, providing the query to a first search engine that searches a set of data sources, the data sources having relationships to an ontology, receiving search results from the search engine, analyzing the search results to determine at least one statistic corresponding to the search results and the query, wherein the statistic is based upon a relevance score that is calculated based upon a first weighting function related to a concept, a second weighting function related to a data source item, a set of items related to the concept, and a set of items related to the search results, and providing at least one concept to a user, wherein said at least one concept correspond to said at least one statistic.

20 Claims, 3 Drawing Sheets

AUTOMATED ADVERTISEMENT PUBLISHER IDENTIFICATION AND SELECTION

CROSS REFERENCE TO RELATED APPLICATIONS

This application is a continuation-in-part of U.S. application Ser. No. 11/265,994, filed Nov. 3, 2005, which claims the benefit of U.S. Provisional Application No. 60/624,558, filed Nov. 3, 2004, U.S. Provisional Application No. 60/677,620, filed May 4, 2005, and U.S. Provisional Application No. 60/723,642, filed Oct. 4, 2005, all of which are incorporated by reference herein. This application claims the benefit of U.S. Provisional Application No. 60/723,642, filed Oct. 4, 2005, which is incorporated by reference herein.

BACKGROUND

1. Field of the Invention

This invention relates generally to the field of information processing and to information modeling systems. More particularly, this invention relates to a method, process, apparatus, and system for advertisement publisher identification and selection.

2. Description of the Related Art

When applied to specific domains and industries (for example healthcare, finance, law, science) traditional search systems are handicapped by approaches to storing, searching, transmitting, and publishing data and/or services that lack domain or industry specificity. Users (e.g., the people or computer system executing a search or publishing information) are frequently unable to obtain satisfying results using traditional search systems. For example, a search engine ranking documents based on a popularity measure but without domain knowledge may not be able to rank documents at the top of the list when they are relevant rather than popular. To be successful, such engines increasingly require that the user have knowledge about the domain in question to an extent that is both prohibitive and unreasonable.

Platforms for publishing (e.g., websites, etc.) have used techniques such as indexing and meta-tagging with meta-data to increase the descriptive power and indexation of documents to increase the likelihood that they are retrieved easily. However, these and other techniques have issues such as naming inconsistencies, inadequate or arguable choices of descriptive fields and difficulty in the maintenance of large vocabularies. Issues such as these have plagued the field of information extraction, search and distribution.

Using an ontology system is one approach to help manage these challenges. However, one limitation of a traditional ontology is that the concepts and relationships in many domains is dynamic and evolving so that the creation and ongoing maintenance of an ontology is time-consuming and labor-intensive. As a result, the practical application of a traditional ontology is limited.

As an example, to create a traditional ontology to a search system in the sports domain, one might model basic concepts and relationships such as 1) the type of sport, 2) the teams within each sport, and 3) the players and coaches for each team. Even in this example, the creation and maintenance of this ontology across a small number of sports may require the modeling of hundreds of teams and thousands of players and coaches. A complete and up-to-date ontology may require historical information and the models would need to be updated whenever the teams within a sport expanded or contracted or whenever a player or coach was drafted or hired, changed teams, or retired.

In order to increase the efficiency of search and publishing, new approaches and techniques are needed to enhance domain knowledge. In addition, it would be useful to apply such approaches and techniques to identify advertising opportunities in the on-line world. For example, it would be useful to have an automated advertisement publisher identification and selection systems and methods to identify websites on which advertisements would be effectively placed.

The identification of online advertising sites for advertisers is made difficult by the lack of automated technology to help search for such sites. Much of this process is done manually. In order to increase the efficiency of site identification and selection, new approaches and techniques are needed that leverage search and domain knowledge techniques.

SUMMARY

In one embodiment of the present invention, a method of automatically identifying target sites on which a user can place an advertisement is provided. The method includes: receiving a search query from a query provider, wherein the search query is related to a merchant's goods or services, and wherein the search query is received over a computer network; generating a set of web pages with an online search engine by providing the search query to the online search engine; filtering the set of web pages to remove a subset of undesirable web pages from the set of web pages, wherein the filtering is performed based upon at least one predetermined rule; analyzing the filtered set of web pages to determine a value of a parameter of web page quality for each web page of the filtered set of web pages; providing a recommended set of web pages to the query provider, wherein said recommended set of web pages comprises at least one web page from the filtered set of web pages that has a corresponding value greater than a predetermined threshold.

In another embodiment of the present invention, a method of automatically identifying target sites on which a user can place an advertisement is provided. The method includes: receiving a search query from a query provider, wherein the search query is related to a merchant's goods or services, and wherein the search query is received over a computer network; generating a set of web pages with an online search engine by providing the search query to the online search engine; analyzing the set of web pages to determine a value of a parameter of web page quality for each web page of the set of web pages; and providing a recommended set of web pages to the query provider, wherein said recommended set of web pages comprises at least one web page from the set of web pages that has a corresponding value greater than a predetermined threshold.

DETAILED DESCRIPTION

According to one aspect of the present invention, a modeling system enriched with information from a single or multiple sources is provided that allows for the intelligent selection of online sites, into various processes, including but not limited to, transmission, discovery, notification, searching, filtering, and storing processes. The invention builds upon, a network of connected information, general or specific to a domain, to identify sites, pages or sets of pages, uniform resource locators (URLs), databases, and other online resources relevant to a specific query, content, message, and other information. Furthermore, the invention allows for definitions of work flow, searches, and event subscription. In one embodiment, a system is provided that selects or increases the quality of selection of online resources for advertisers.

To accomplish this increase in power of systems or methodologies, the present invention, in one embodiment, can include: (i) a set of tools capable of storing, processing, searching, publishing, and/or transmitting information and/or data from multiple sources related to a query, content, message, and/or other information, (ii) a set of services to identify, extract, and/or derive online resources; and/or (iii) a set of services to generate statistical and/or ranking information related to the online resources.

In one embodiment, a human or a system assisted by the set of tools generates a database of content relevant to a specific query by interacting with a computer using input and output devices. The set of services then extract relevant online resources from the content database. A set of services generates statistical rankings of these resources. The system then utilizes this information for various search, publication, discovery, and/or notification services.

For example, in one embodiment, a user provides a search query to be executed with a search service. A list of search results is generated and analyzed. The online resources associated (e.g., web sites) with these results are identified. The statistical system then generates a number of results for example, but not limited to, the number of pages in those resources that match the query. The system can then rank the sites by that number.

The search query specific statistics can be used to design different strategies or information processing including, but not limited to, the identification of advertising sites.

Figure 1:
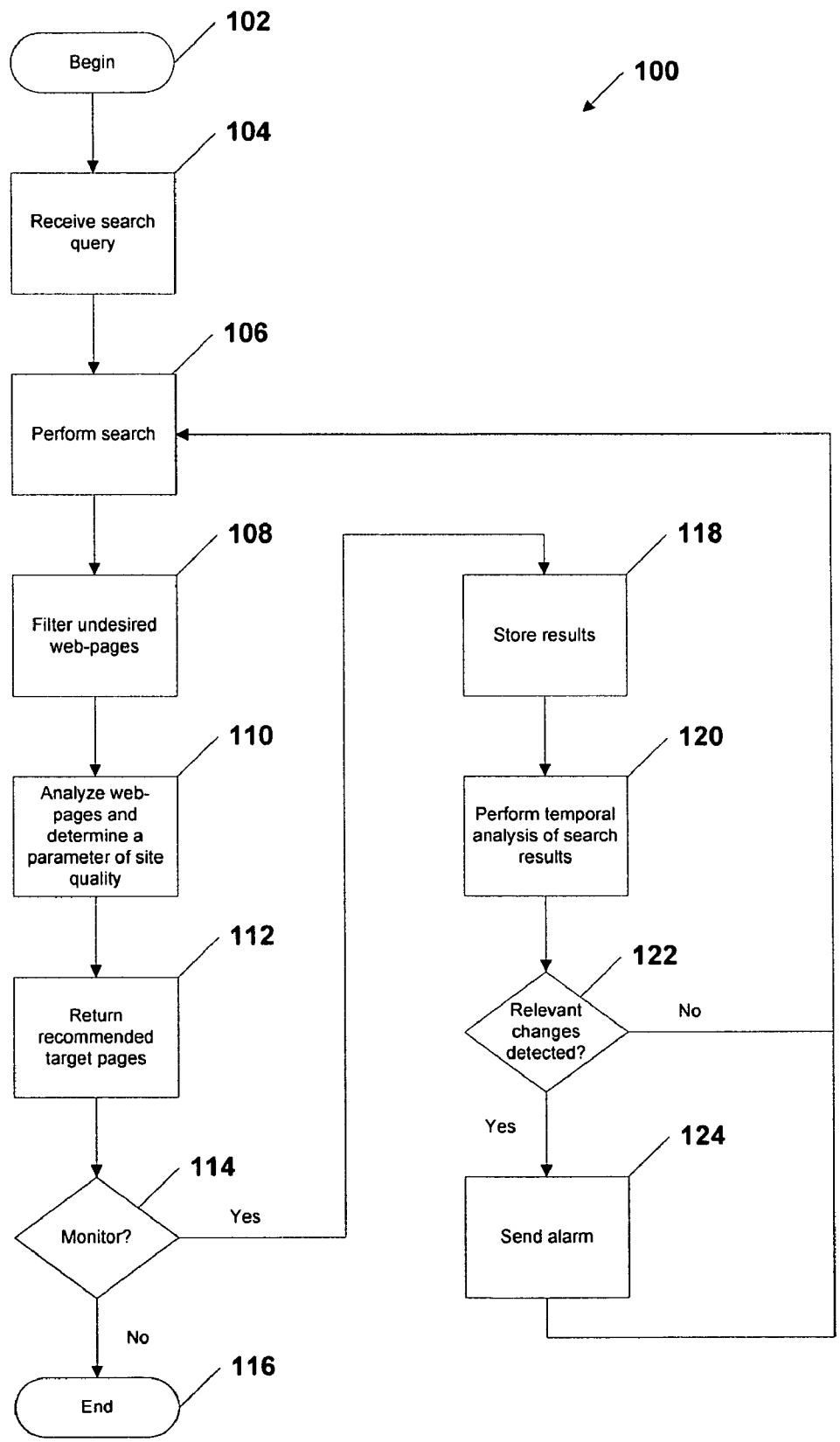
FIG. 1 shows a method of automated advertisement publisher identification and selection in accordance with one embodiment of the present invention.

FIG. 1 shows a method 100 of automated advertisement publisher identification and selection in accordance with one embodiment of the present invention. The term "publisher" is a broad term intended to have its ordinary meaning. In addition, the term "publisher" is intended to refer to web sites on which advertising is displayed.

The method 100 begins at step 102. At step 104, a search query is received. The search query can be any query provided to a search engine, such as a query that an advertiser believes a prospective client would enter to search for the advertiser's goods and/or services. The search query can include keyword related to an advertiser's goods and/or services, or can be a keyword having a particular popularity or meaning relevant to the advertiser.

The search query can be received from an advertiser seeking to identify web sites in which advertising is recommended, to optimize advertisement placement, and/or to increase conversion (e.g., the number of "clicks" generated by a site user on an advertisement and/or link). In other embodiments, the search query is received from an advertisement broker (e.g., a party that sells advertising, such as Google, Yahoo!, etc.) that is seeking to identify target web sites. The target web sites can be web sites that are not yet participating in an advertising program with the advertisement broker.

At step 106, the method 100 performs a search to generate a set or list of web-pages. The list of web-pages can be those returned by one or more search engines as a result of searching the Internet for the search query. For example, the list of web-pages can be those returned by Google, Yahoo!, and/or any other Internet search engine when the search engine is provided with the search query. The search engine can include horizontal search engines (e.g., Google, Yahoo!, etc.), vertical search engines (e.g., globalspec.com, etc.), and/or an "enhanced" search engine, such as a search engine that combines aspects of both horizontal and vertical searching (e.g., medigle.com, etc.). Additional embodiments of search engines, including enhanced search engines, are described in U.S. application Ser. No. 11/265,994, filed Nov. 3, 2005; U.S. Provisional Application No. 60/624,558, filed Nov. 3, 2004; U.S. Provisional Application No. 60/677,620, filed May 4, 2005; and U.S. Provisional Application No. 60/723,642, filed Oct. 4, 2005, all of which are incorporated by reference herein At step 108, the method 100 filters the list. For example, at step 108 the method 100 can remove undesired web-pages from the list based upon particular criteria or rules, which in one embodiment are predetermined rules. In some embodiments non-advertisement compatible web sites are removed from the list generated at step 106. Non-advertisement compatible web sites can include those having a .gov or a .edu top level domain. Alternatively, or in addition, at step 108 the method 100 can remove web sites from the list that are not compatible with, or participating with, a particular advertising program, system, or network (e.g., non-ADSENSE participating web sites, etc.). In some embodiments, step 108 is not performed, and the method 100 does not filter the list generated at step 106.

At step 110, the method 100 analyzes the resulting list of filtered results. However, in embodiments that don't include step 108, at step 110 the method 100 analyzes the results generated at step 106. The analysis performed at step 110 can include any of a variety of procedures and/or processes to determine a value of a parameter of web site quality to each web site identified on the list. For example, the analysis can return a value of relevancy, site traffic, and/or revenue generated for each web site identified on the list. The analysis can also sort the list based upon the values assigned to each web site.

The parameter of web site quality can be any one of, or a combination of: the number of pages on the web site that contain content relevant (e.g., identical to, synonymous with, and/or related to) to the query; a ratio of the number of pages on the web site that contain content relevant to the query to the total number of pages on the web site; the total number of "autofocus" pages on the web site (which can include pages on the web site identified by an enhanced search engine searching for the search query); the ratio of autofocus pages to total pages on the web site; the ratio of autofocus pages to relevant pages on the web site; and/or an adjusted autofocus ratio.

The phrase "on the web site" is a broad term intended to have its ordinary meaning. In addition, the phrase "on the web site" is intended to also refer to web pages accessible though the web site.

At step 112, the method 100 returns a recommendation, for example, a list of web sites having a parameter of quality value greater than or greater than or equal to a threshold level. For example, in one embodiment, at step 112, the method 100 provides a list of web sites related to the search query that have a total number of pages greater than a predetermined threshold level.

The method 100 can then terminate at step 116, or may continue to step 114 through step 124, where search results are monitored. At step 114, the method 100 determines if search results are to be monitored. If not, the method 100 continues to step 116, where the method terminated. However, if search results are to be monitored, the method 100 continues to step 118.

At step 118, the method 100 stores the results generated at any one of, or any combination of the preceding steps of the method 100. For example, at step 118, the method 100 stores the list of recommendations (e.g., web sites to be targeted for advertising) generated at step 112.

At step 120, the method 120 performs temporal analysis of the results stored at step 118. For example, at step 120, the method 100 can determine if more or fewer results are returned by the method 100 for the same search query, using the same search engines, over a given time period.

At step 122, the method 100 determines if relevant changes have been detected. For example, at step 122, the method 100 can determine if the number of relevant web pages on recommended web site has decreased a predetermined amount (e.g., if the number of relevant pages has dropped by about 5%, about 10% or about 25% from the last and/or first time the method 100 was performed). If relevant changes are not detected, the method 100 proceeds back to step 106 after a predetermined period of time, after which the method 100 is repeated. If relevant changes are detected, the method 100 proceeds to step 124.

At step 124, the method 100 provides an alarm to indicate the change in results detected by the method 100. For example, at step 124, the method 100 can send an email, a text-message, a page, and/or initiate a phone call to a user to inform him or her of the change in results. At that time, the user, such as an advertiser, can determine that it should change the web sites on which it is currently running and/or displaying its advertisements. In some embodiments, the method 100 automatically changes and/or adds to the web sites on which the advertiser is running and/or displaying its advertisements in response to the changes detected by the method 100.

Figure 2:
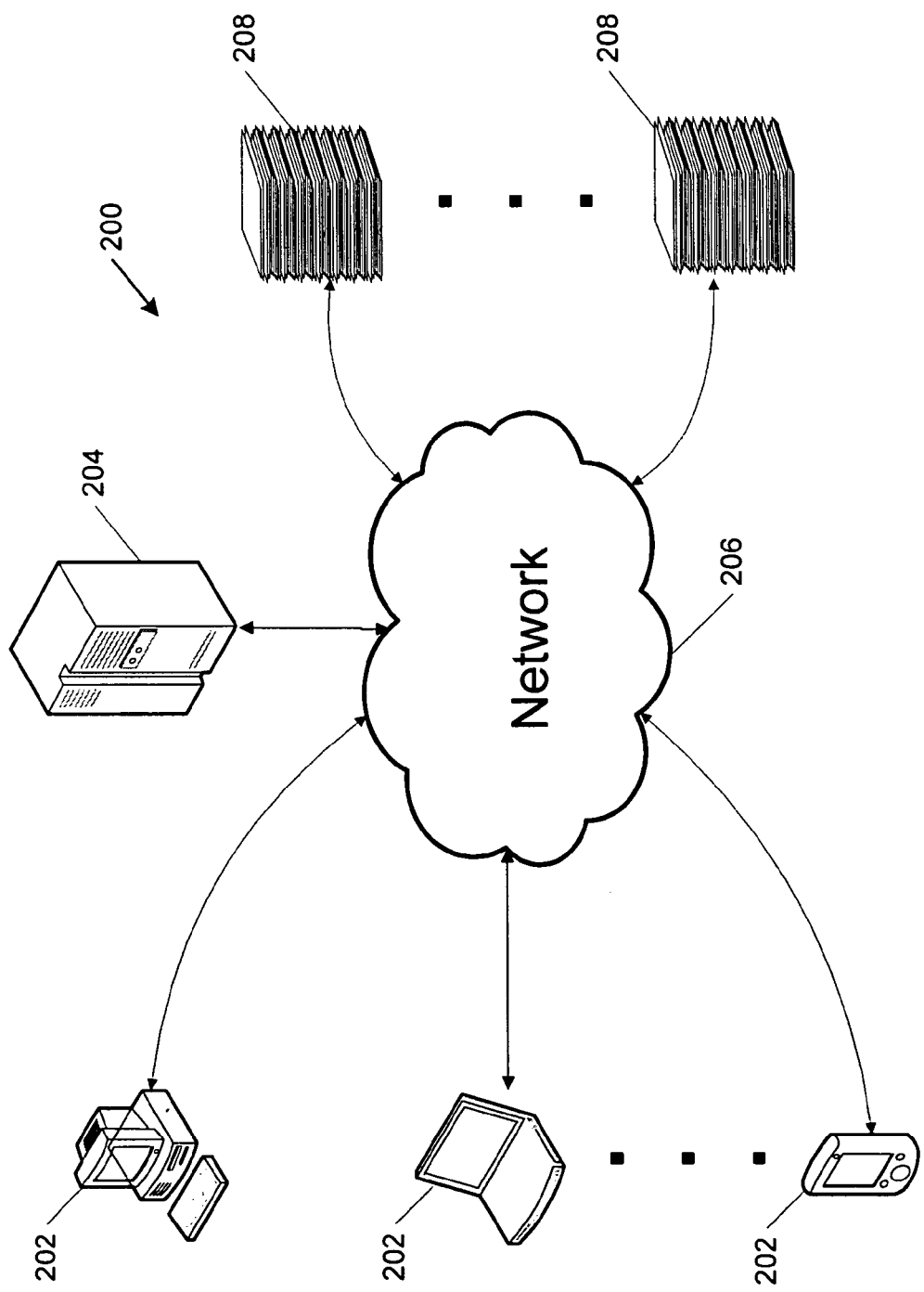
FIG. 2 shows a system adapted to perform the method of FIG. 1.

FIG. 2 shows a system for performing automated advertisement publisher identification and selection in accordance with another embodiment of the present invention. The system 200 includes at least one client 202 in communication with at least one server 204 via a network 206. A user, such as an advertiser, can perform automated advertisement publisher identification and selection, to identify a publisher 208 with whom the user can display advertising materials.

The client 202 can be any of a variety of computing devices known to those of skill in the art, including: a computer, a telephone, a personal digital assistant (PDA), a laptop computer, a terminal and/or a workstation. The server can also be any of a variety of computing devices known to those of skill in the art, including: a computer, a telephone, a personal digital assistant (PDA), a laptop computer, and/or a workstation. The network 306 can be any communications network known to those of skill in the art, including a wired network, a wireless network, a WAN, a LAN, the Internet, and/or a combination of any of the above. The publisher 208 can include a web site and/or a web page viewable to a user over the network 306.

Figure 3:
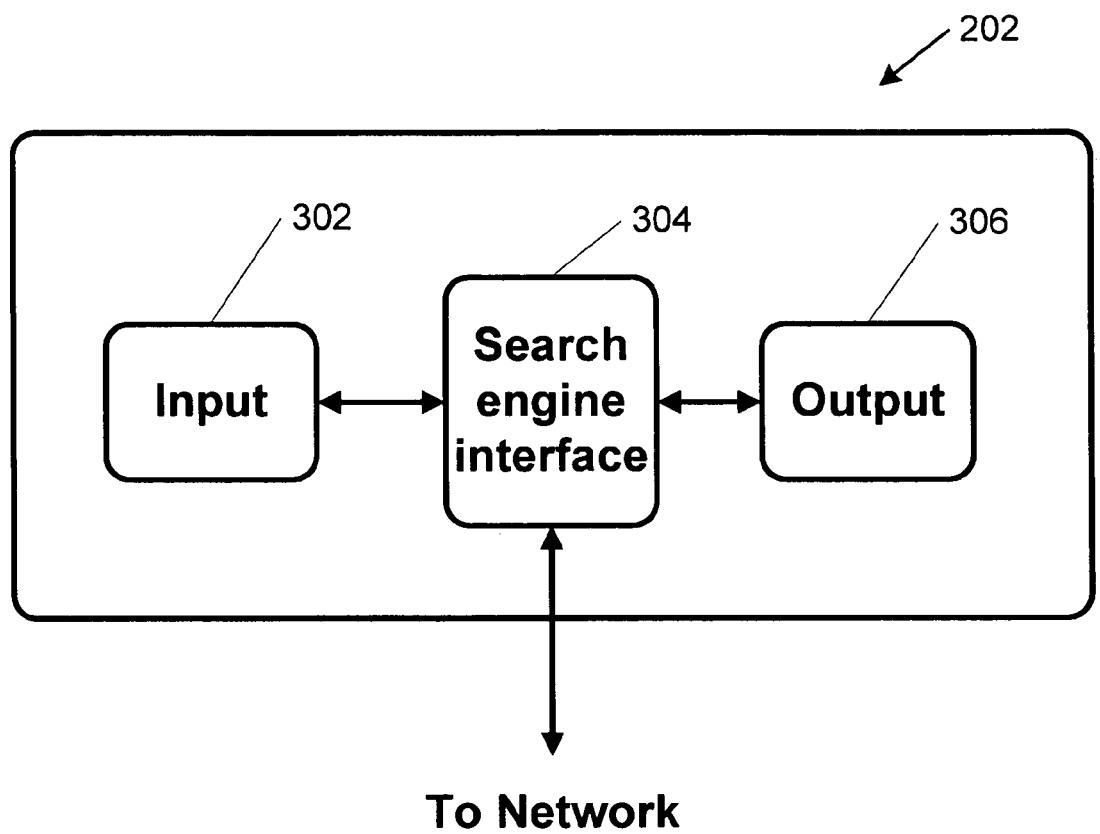
FIG. 3 shows a client of the system of FIG. 2 adapted to perform the method of FIG. 1.

FIG. 3 shows a client in accordance with yet another embodiment of the present invention. The client 202 generally includes an input device 302, a search engine interface 304, and an output device. The input device 302 can be any input device known to those of skill in the art, including: a keypad, a microphone, a touch-pad, a tablet, a mouse, and/or any other input device. The search engine interface 304 can include any software and/or hardware for interfacing with a search engine over a network. For example, the search engine interface 304 can include a web browser, a microprocessor, a network interface card, and/or a modem. The output device 306 can be any output device known to those of skill in the art, including: a display, a monitor, a speaker, a printer, and/or any other output device.

The search engine interface 304 can be adapted to perform automated advertisement publisher identification and selection. For example, the search engine interface 304 can be adapted to perform at least one of the steps of the method 100 described in greater detail above with respect to FIG. 1.

Although this invention has been disclosed in the context of certain preferred embodiments, it will be understood by those skilled in the art that the present invention extends beyond the specifically disclosed embodiment to other alternative embodiments and/or uses of the invention and obvious modifications and equivalents thereof. In particular, while the present automated advertisement publisher identification and selection system and methods have been described in the context of a particularly preferred embodiment, the skilled artisan will appreciate, in view of the present disclosure, that certain advantages, features and aspects of the information communication system, device, and method may be realized in a variety of other applications and software systems. Additionally, it is contemplated that various aspects and features of the invention described can be practiced separately, combined together, or substituted for one another, and that a variety of combination and sub-combinations of the features and aspects can be made and still fall within the scope of the invention.

Those of skill in the art will understand that information and signals can be represented using a variety of different technologies and techniques. For example, data, instructions, commands, information, signals, bits, symbols, and chips that can be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein can be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC); a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or other form of storage medium known in the art. A storage medium is coupled to the processor, such that the processor can read information from, and write information to, the storage medium. In the alternative, the storage medium can be integral to the processor. The processor and the storage medium can reside in an ASIC. The ASIC can reside in a user terminal. The processor and the storage medium can reside as discrete components in a user terminal.

The previous description of the disclosed embodiments is provided to enable a person skilled in the art to make or use the present invention. Various modifications to these embodiments will be readily apparent to those skilled in the art, and the generic principles defined herein can be applied to other embodiments without departing from the spirit or scope of the invention. Thus, the invention is limited only by the claims that follow. Thus, it is intended that the scope of the present invention herein disclosed should not be limited by the particular disclosed embodiment described above, but should be determined only by a fair reading of the claims that follow.

What is claimed is:

1. A computer-implemented method of automatically identifying target sites on which to place an advertisement, the computer-implemented method comprising:
    employing a processor to execute computer-executable instructions, that when executed by the processor, cause the processor to:
        filtering filter a set of generated web pages to remove a subset of non-advertisement compatible web pages from the set of generated web pages,
            wherein the filtering is performed based, in part, on at least one selected rule, and
            wherein the set of generated web pages is generated based, in part, on a search query provided by a query provider, and is related to at least one of goods or services associated with the query provider;
        analyze the filtered set of web pages to determine a value of a parameter of web page quality for one or more of the web pages of the filtered set of web pages to facilitate identifying and selecting target sites on which to place the advertisement;
        provide a recommended set of web pages to the query provider, the recommended set of web pages comprising at least one web page from the filtered set of web pages, wherein the at least one web page has a corresponding value of the parameter of web page quality, the corresponding value being greater than a selected threshold;
        determine whether at least a selected amount of change in content has occurred with regard to the at least one web page of the recommended set of web pages;
        provide, to the query provider, an alarm message indicating that at least the selected amount of change in content has occurred with regard to the at least one web page of the recommended set of web pages, to facilitate modifying target sites on which to place the advertisement; and
        automatically modify the recommended set of web pages based, at least, on the change in content that has occurred, wherein automatically modifying comprises automatically removing from the recommended set of web pages, the at least one web page for which the alarm message was provided to the query provider.

2. The computer-implemented method of claim 1, wherein the query provider comprises an advertisement broker.

3. The computer-implemented method of claim 1, wherein the search query is received via a computer network that comprises the Internet.

4. The computer-implemented method of claim 1, wherein the set of generated web pages is generated by an online search engine comprising a vertical search engine.

5. The computer-implemented method of claim 1, wherein the set of generated web pages is generated by an online search engine comprising a horizontal search engine.

6. The computer-implemented method of claim 1, wherein the filtering comprises removing web pages having a .gov or a .edu top level domain.

7. The computer-implemented method of claim 1, wherein the filtering comprises removing web pages that do not participate with a selected advertising program.

8. The computer-implemented method of claim 1, wherein the parameter of web page quality comprises a relevancy score of the web page.

9. The computer-implemented method of claim 1, wherein the parameter of web page quality comprises site traffic of the web page.

10. The computer-implemented method of claim 1, wherein the parameter of web page quality comprises revenue generated by the web page.

11. The computer-implemented method of claim 1, wherein the providing the recommended set of web pages comprises providing a list of web sites that includes a quantity of web pages greater than the selected threshold.

12. A computer-implemented method of automatically identifying target web sites on which to place an advertisement, the computer-implemented method comprising:
    employing a processor to execute computer-executable instructions, that when executed by the processor, cause the processor to:
        receive a search query from a query provider, wherein the search query is related to at least one of a merchant's goods or a merchant's services, and wherein the search query is received over a computer network;
        generate a set of web pages with an online search engine by providing the search query to the online search engine;
        analyze the set of web pages to determine a value of a parameter of web page quality for one or more of the web pages of the set of web pages;
        provide a recommended set of web pages to the query provider, the recommended set of web pages comprising at least one web page from the set of web pages, wherein the at least one web page has a value of the parameter of web page quality that is greater than a selected threshold;
        monitor the recommended set of web pages to facilitate detecting whether at least a selected amount of change in content has occurred with regard to the at least one web page of the recommended set of web pages;
        determine whether at least the selected amount of change in content has occurred with regard to the at least one web page of the recommended set of web pages; and provide, to the query provider, an alarm message indicating that at least the selected amount of change in content has occurred with regard to the at least one web page of the recommended set of web pages to facilitate modifying target sites on which to place the advertisement; and automatically modify the recommended set of web pages based, at least, on the change in content that has occurred, wherein automatically modifying comprises automatically removing from the recommended set of web pages, the at least one web page for which the alarm message was provided to the query provider.

13. The computer-implemented method of claim 12, wherein the query provider comprises an advertisement broker.

14. The computer-implemented method of claim 12, wherein the computer network comprises the Internet.

15. The computer-implemented method of claim 12, wherein the online search engine comprises a vertical search engine.

16. The computer-implemented method of claim 12, wherein the online search engine comprises a horizontal search engine.

17. The computer-implemented method of claim 12, wherein the parameter of web page quality comprises a relevancy score of the web page.

18. The computer-implemented method of claim 12, wherein the parameter of web page quality comprises site traffic of the web page.

19. The computer-implemented method of claim 12, wherein the parameter of web page quality comprises revenue generated by the web page.

20. The computer-implemented method of claim 12, wherein the providing the recommended set of web pages comprises providing a list of web sites that includes a quantity of web pages greater than the selected threshold.

* * * * *